June 23, 1936.  R. BARTHELEMY  2,045,288
GASEOUS LUMINOUS LAMP
Filed Nov. 30, 1931
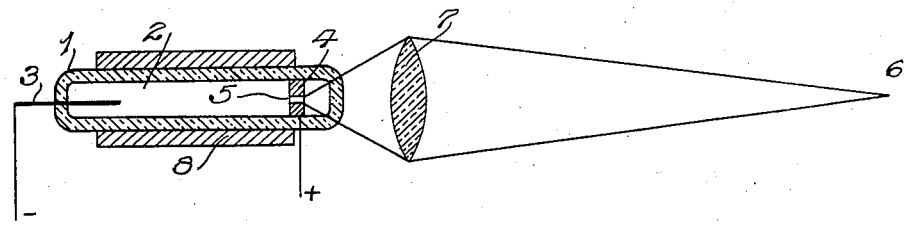
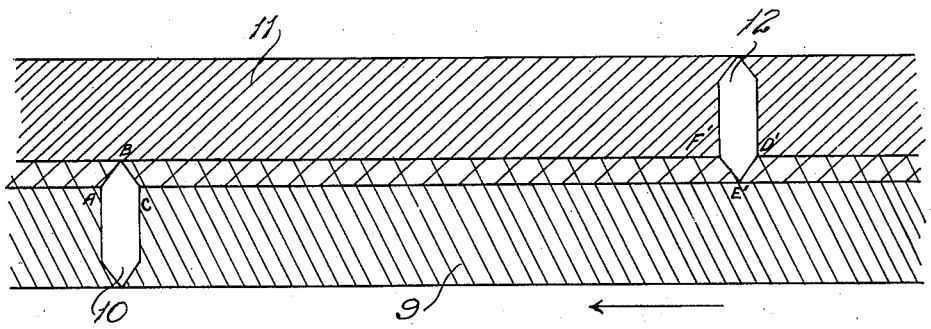
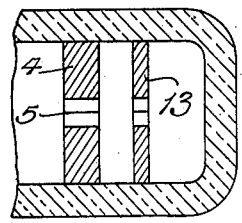
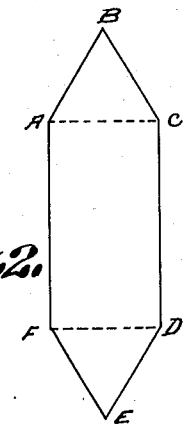
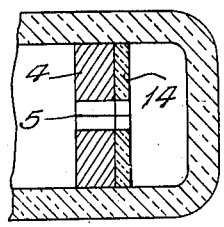
Inventor
RENÉ BARTHELEMY
By Haseltine, Lake & Co.
Attorneys Patented June 23, 1936

2,045,288

UNITED STATES PATENT OFFICE 2,045,288

GASEOUS LUMINOUS LAMP

René Barthélemy, Fontenay Aux Roses, France, assignor to Compagnie pour la Fabrication des Compteurs et Materiel d'Usines a Gaz, Montrouge, France Application November 30, 1931, Serial No. 578,005
In France December 4, 1930

12 Claims. (Cl. 176—122)

In receiving apparatus for television, telecinematography and like devices the image is generally obtained by means of a small luminous surface traversing the screen in parallel juxtaposed bands, the intensity of the said luminous surface being modulated in accordance with the variations of the receiver current.

In order to obtain a good projection, it is necessary that the small surface traversing the screen shall be very luminous in order that the screen may have a sufficient luminosity, and that it shall have a definite form in order to obtain a clear image and in order to avoid the formation on a screen of dark or brilliant lines.

The present invention has for its object to realize such a luminous surface.

This result is obtained by the special construction of a lamp of which the luminous flux will furnish, after its passage through the optical systems of the receiving apparatus, the image having the desired properties.

The lamp according to the present invention is arranged in such a manner that one can obtain a luminous source of great brilliancy and having the desired shape. The light is produced in a tube of small diameter containing a gas under low pressure and subjected to a suitable difference of potential. This tube is provided with two electrodes placed in such a manner that one can see, from the end of the tube, the luminous column at its smallest section, this visible section being limited moreover by a diaphragm of suitable form and the tube being, on the other hand, surrounded laterally by a screen forming an opaque sheath of which the internal surface is reflecting in such a manner as to increase the luminous intensity at the axis of the gaseous column.

The luminous beam being seen from its end, and the screen sheath returning on the said beam the light dissipated laterally, there is obtained a strong luminous intensity.

The aperture of the diaphragm will have a shape such that the optical systems of the receiver give on the projection screen a suitable image of this aperture. A satisfactory solution is obtained by giving to the said aperture the form of a rectangle elongated in a direction perpendicular to that of the sweeping of the screen. But it is preferable to give the said aperture the form of a rectangle of which the base, supposed to be horizontal, is smaller than the height, supposed to be vertical (in the case of a horizontal sweeping of the luminous beam), the said rectangle being completed by two triangles at the top and the bottom of which the basis are equal and connected to the basis of the rectangle and of which the height is less than that of the rectangle. The apparatus is then set up in such a manner that there are, on the screen, surfaces swept both by the lower triangle of one band and the upper triangle of one band and the upper triangle of the preceding band, in the case in which the screen is swept by horizontal bands from bottom to top.

According to one form of carrying out the present invention, the diaphragm will be placed behind one of the electrodes at a very small distance from the same, the said electrode being pierced by a suitable hole, circular for example, with respect to that of the diaphragm, but clearly larger.

One simplified embodiment consists in utilizing one of the electrodes, in general the anode, as the diaphragm. One thus obtains the maximum luminous flux for a given aperture. The electrode forming the diaphragm is then pierced by an aperture having the chosen rectangular or hexagonal form. In this case, a precaution has to be taken. There can in effect be formed a luminous expansion on the conducting face of the electrode which forms the diaphragm, on the opposite side to the luminous column. It is thus necessary to provide this conducting face with a layer or plate of insulating material which prevents the formation of the luminous expansion which would interfere with the clarity of the image. The plate or screen thus added must have the same form of aperture as that provided on the electrode.

The attached drawing, given by way of example, enables the manner in which the present invention is carried out to be readily appreciated.

Figure 1 is a section of one form of lamp.

Figure 2 shows an advantageous shape of the aperture in the diaphragm.

Figure 3 explains the advantage of this form of aperture.

Figure 4 is a detail modification of parts shown in Figure 1.

Figure 5 is another detail modification of the same.

Throughout the views, the same references indicate the same or like parts.

In Figure 1, the glass tube 1 contains gas 2 at low pressure, generally neon or helium. The modulated voltage is applied across the electrodes 3 and 4. The electrode 4, preferably the anode, is provided with an aperture 5 having a rectangular or hexagonal shape of elongated form, as will be defined hereinafter. It is the image 6 of this aperture which traverses the screen, the image being given by the optical systems of the receiver represented diagrammatically by the lens 7.

Figure 4 shows in detail the design of the right end of the lamp or tube of Figure 1, when a diaphragm 13 is added to the electrode 4. This diaphragm may be spaced any desired distance from the electrode, or it may as such be connected to the latter.

Figure 5 illustrates a case in which the electrode 4 forms the diaphragm which is provided with an insulating layer 14 upon its surface opposite the discharge.

The tube is provided with a metallic sheath or screen 8, internally polished, and which throws back the light on to the axis of the luminous column.

The aperture provided in the diaphragm in the electrode which takes the place of the same can be rectangular. The ratio between the small side and the large side of the rectangle may be advantageously about one to two. This elongated form of the rectangle arranged perpendicularly to the plane of sweeping enables the definition of the image to be considerably increased in the plane of exploration along the elementary lines.

Another interesting form is that shown in Figure 2. With the rectangle ACDF above defined are associated two small triangles ABD, DEF, of which the base is common with the small side of the rectangle and of which the height is chosen so as to be equal to about one half or one third of the eight AF of the rectangle.

This arrangement is theoretically the best to ensure that the elementary surface 9 swept, for example, by the luminous beam 10 (Figure 3) shall only cover the contiguous surface 11 swept by the following beam 12 to a height equal to the eight of the triangles ABC, F"E'D'. This arrangement is such that, in the absence of all modulation, luminous base obtained on the screen will have a constant intensity over the whole of its surface and will not present longitudinal black and brilliant lines.

On the other hand, the sensation of light and shade given by the reconstitution is greatly reduced if the triangle has a small height as compared to its base and the definition of reconstitution of the image is thus increased by choosing this base as small as possible.

It will be well understood that the similar forms may be used without departing from the spirit of this invention, thus, for example, may be mentioned the use of a diaphragm of elliptical form enveloping the polygon ABCDEF or even a diaphragm in the form of a lozenge, giving results of a better quality than apertures heretofore employed either in the discs or in the projectors of television apparatus.

What I claim is:—

1. Luminous gas filled tube for television, telecinematography and other projections, comprising a long tube having a relatively small diameter and containing low pressure gas, an electrode disposed within each end of said long tube, wires abutting against the two electrodes for applying thereto a modulated potential difference and for producing an electric discharge between said electrodes, and means for utilizing only the light produced in the axis of said discharge, including a diaphragm disposed within said tube having the aperture thereof provided in the form of an elongated rectangle centrally arranged with respect to the axis of said tube and an opaque covering enveloping said tube and having a reflecting interior surface directing the light developed in the tube into the axis thereof.

2. Luminous gas filled tube for television, telecinematography and other projections, comprising a long tube having a relatively small diameter and containing low pressure gas, an electrode disposed within each end of said long tube, wires abutting against the two electrodes for applying thereto a modulated potential difference and for producing an electric discharge between said electrodes, and means for utilizing only the light produced in the axis of said discharge, including a diaphragm disposed within said tube having the aperture thereof provided in the form of an elongated rectangle with a triangle attached to each of the small sides of the rectangle, the bases of the triangles being equal in length to said sides of the rectangle, said aperture being arranged centrally with respect to the axis of said tube and an opaque covering enveloping said tube and having a reflecting interior surface directing the light developed in the tube into the axis thereof.

3. Luminous gas filled tube for television, telecinematography and other projections, comprising a long tube having a relatively small diameter and containing low pressure gas, an electrode disposed within one end of said long tube, an electrode forming a diaphragm disposed within the other end of the tube, means for applying a modulated difference of potential to said electrodes and producing an electric discharge between the latter including wires abutting against said electrodes, which diaphragm is centrally disposed with respect to the axis of said tube in order to utilize solely the light produced in the axis of said electric discharge and is provided with a layer of insulating material upon the conducting surface opposite said discharge, and an opaque covering enveloping said tube and having a reflecting interior surface directing the light developed in the tube into the axis thereof.

4. Luminous gas filled tube for television, telecinematography and other projections, comprising a long tube having a relatively small diameter and containing low pressure gas, an electrode disposed within each end of said long tube, wires abutting against the two electrodes for applying thereto a modulated potential difference and for producing an electric discharge between said electrodes, and means for utilizing only the light produced in the axis of said discharge, including a diaphragm centrally disposed within said tube with respect to the axis thereof and an opaque covering enveloping said tube and having a reflecting interior surface adapted to direct the light developed into the axis of said tube.

5. Luminous gas filled tube for television, telecinematography and other projections, comprising a long tube having a relatively small diameter and containing low pressure gas, an electrode disposed within one end of said long tube, an electrode forming a diaphragm disposed within the other end of the tube, means for applying a modulated difference of potential to said electrodes and producing an electric discharge between the latter including wires abutting against said electrodes, and an opaque covering enveloping said tube and having a reflecting interior surface serving to direct the light developed into the axis of said tube, and which diaphragm is centrally disposed with respect to the axis of said tube in order to utilize solely the light produced in the axis of said electric discharge.

6. Luminous gas filled tube for television, telecinematography and other projections, comprising a long tube having a relatively small diameter and containing low pressure gas, an electrode disposed within one end of said long tube, an electrode forming a diaphragm disposed within the other end of the tube, means for applying a modulated difference of potential to said electrodes and producing an electric discharge between the latter including wires abutting against said electrodes, which diaphragm is centrally disposed with respect to the axis of said tube, having the aperture thereof provided in the form of an elongated rectangle in order to utilize solely the light produced in the axis of said electric discharge and having the conducting surface thereof opposite said discharge provided with a layer of insulating material and an opaque covering enveloping said tube and having a reflecting interior surface directing the light developed in the tube into the axis thereof.

7. Luminous gas filled tube for television, telecinematography and other projections, comprising a long tube having a relatively small diameter and containing low pressure gas, an electrode disposed within one end of said long tube, an electrode forming a diaphragm disposed within the other end of the tube, means for applying a modulated difference of potential to said electrodes and producing an electric discharge between the latter including wires abutting against said electrodes, which diaphragm is centrally disposed with respect to the axis of said tube, having the aperture thereof provided in the form of an elongated rectangle, with a triangle attached to each of the small sides of the rectangle, the bases of the triangles being equal in length to said sides of the rectangle, said aperture being arranged centrally in order to utilize solely the light produced in the axis of said electric discharge, a layer of insulating material disposed upon the conducting side of the diaphragm which is opposite said discharge, and an opaque covering enveloping said tube and having a reflecting interior surface directing the light developed in the tube into the axis thereof.

8. Luminous gas filled tube for television, telecinematography and other projections, comprising a long tube having a relatively small diameter and containing low pressure neon gas, an electrode disposed within one end of said long tube, an electrode forming a diaphragm disposed within the other end of the tube, means for applying a modulated difference of potential to said electrodes and producing an electric discharge between the latter including wires abutting against said electrodes, and an opaque covering enveloping said tube and having a reflecting interior surface serving to direct the light developed into the axis of said tube, and which diaphragm is centrally disposed with respect to the axis of said tube in order to utilize solely the light produced in the axis of said electric discharge.

9. Luminous gas filled tube for television, telecinematography and other projections, comprising a long tube having a relatively small diameter and containing low pressure helium gas, an electrode disposed within one end of said long tube, an electrode forming a diaphragm disposed within the other end of the tube, means for applying a modulated difference of potential to said electrodes and producing an electric discharge between the latter including wires abutting against said electrodes, and an opaque covering enveloping said tube and having a reflecting interior surface serving to direct the light developed into the axis of said tube, and which diaphragm is centrally disposed with respect to the axis of said tube in order to utilize solely the light produced in the axis of said electric discharge.

10. Luminous gas filled tube for television, telecinematography and other projections, comprising a long tube having a relatively small diameter and containing low pressure gas, an electrode disposed within one end of said long tube, a second electrode disposed within the other end of the tube, means for applying a modulated difference of potential to the electrodes and producing an electric discharge between the latter including wires abutting against said electrodes, which second electrode forms a diaphragm centrally disposed in respect to the axis of said tube and provided with an aperture, made in the form of an elongated rectangle which is increased and altered by a pair of triangles individually attached to the smaller sides thereof and having the bases of the triangles adjacent to said smaller aperture sides substantially equal in length in order to utilize solely the light produced in the axis of said electric discharge.

11. Luminous gas filled tube for television, telecinematography and other projections, comprising a long tube having a relatively small diameter and containing low pressure neon gas, an electrode disposed within one end of said long tube, a second electrode forming a diaphragm disposed within the other end of the tube, means for applying a modulated difference of potential to the electrodes and producing an electric discharge between the latter including wires abutting against said electrodes, which diaphragm is centrally disposed with respect to the axis of the tube in order to utilize solely the light produced in the axis of said electric discharge and has the conducting surface thereof opposite said discharge provided with a layer of insulating material, and an opaque covering enveloping said tube and having a reflecting interior surface serving to direct the light developed into the axis of said tube.

12. Luminous gas filled tube for television, telecinematography and other projections, comprising a long tube having a relatively small diameter and containing low pressure helium gas, an electrode disposed within one end of said long tube, a second electrode forming a diaphragm disposed within the other end of the tube, means for applying a modulated difference of potential to the electrodes and producing an electric discharge between the latter including wires abutting against said electrodes, which diaphragm is centrally disposed with respect to the axis of the tube in order to utilize solely the light produced in the axis of said electric discharge, an opaque covering enveloping said tube and having a reflecting interior surface serving to direct the light developed into the axis of said tube, and a layer of insulating material disposed upon the conducting side of the diaphragm which is opposite said discharge.

RENÉ BARTHÉLEMY.